United States Patent [19]

Kita

[11] Patent Number: 4,716,788

[45] Date of Patent: Jan. 5, 1988

[54] ACCELERATION CONTROL SYSTEM FOR AUTOMOBILES

[75] Inventor: Yasuo Kita, Kyoto, Japan

[73] Assignee: Shimadzu Corporation, Japan

[21] Appl. No.: 792,294

[22] Filed: Oct. 28, 1985

[30] Foreign Application Priority Data

Oct. 29, 1984 [JP] Japan .................. 59-228798

[51] Int. Cl.⁴ .......................................... B60K 41/16
[52] U.S. Cl. ................................... 74/858; 74/859; 74/872
[58] Field of Search .............. 74/872, 877, 859, 858, 74/857, 522; 474/18, 28

[56] References Cited

U.S. PATENT DOCUMENTS

| | | | |
|---|---|---|---|
| 3,195,368 | 7/1965 | Boudewijn | 474/18 |
| 3,283,606 | 11/1966 | Brueder | 74/857 |
| 3,302,487 | 2/1967 | Kempson | 74/857 |
| 3,893,344 | 7/1975 | Dantlgraber et al. | 474/28 |
| 3,927,528 | 12/1975 | van der Kolk et al. | 74/859 |
| 4,152,947 | 5/1979 | van Deursen et al. | 474/11 |
| 4,232,572 | 11/1980 | Ross et al. | 74/877 |
| 4,342,298 | 8/1982 | Ganoung | 74/877 |
| 4,458,561 | 7/1984 | Frank | 74/857 |
| 4,515,041 | 5/1985 | Frank et al. | 74/857 |

Primary Examiner—Leslie Braun
Assistant Examiner—Martin G. Belisario
Attorney, Agent, or Firm—Franklin D. Wolffe; Morris Fidelman

[57] ABSTRACT

In an automobile which employs an engine the output of which varies with the amount of operation applied to the operating terminal of the engine and a continuously variable transmission having a reduction ratio which can be rendered infinite or close to infinity when the automobile is started, and acceleration control system comprising a torque detector for detecting the output torque of the transmission, and a corrector for correcting the amount of operation to be applied to the operating terminal in such a manner that when the torque detector detects the output torque of the engine having exceeded a predetermined allowable maximum level, the engine output is reduced so as to offset the excessive amount of torque.

8 Claims, 2 Drawing Figures

ACCELERATION CONTROL SYSTEM FOR AUTOMOBILES

BACKGROUND OF THE INVENTION

This invention relates to an acceleration control system for automobiles provided with a continuously variable transmission commonly referred to as a CVT.

With the recent marked development of hydraulic pump/motors having high efficiency, it has become possible to greatly improve the performance of a hydrostatic transmission referred to as an HST or a hydromechanical transmission referred to as an HMT which both comprise a combination of such hydraulic pump/motors. Now the time is becoming ripe for application of these transmissions to automobiles which require a transmission having a high performance characteristic.

Since the engine with one of the transmissions of the above-mentioned types can be started with the reduction ratio set to infinity, theoretically they do not require a clutch or a torque converter. This is a great advantage. However, if the continuously variable transmission of such characteristics as mentioned above is used in an autmobile having a conventional driving system, a trouble is likely to occur during the acceleration stage immediately after the automobile has started to move. In particular, since the reduction ratio of the transmission is close to infinity at the start of the engine, if the accelerator pedal is stepped in a usual manner, the pressure of the hydraulic pump becomes excessive so that the relief valve opens, with resulting loss of energy and racing of the engine.

Accordingly, the primary object of the invention is to completely eliminate the above-mentioned and other difficulties in an acceleration control system for automobiles which employ a continuously variable transmission such as either of the above-mentioned types in connection with its engine the output of which is controlled by the driver operating the accelerator.

The invention will be described in detail with reference to the accompanying drawing.

SUMMARY OF THE INVENTION

Figure 1:
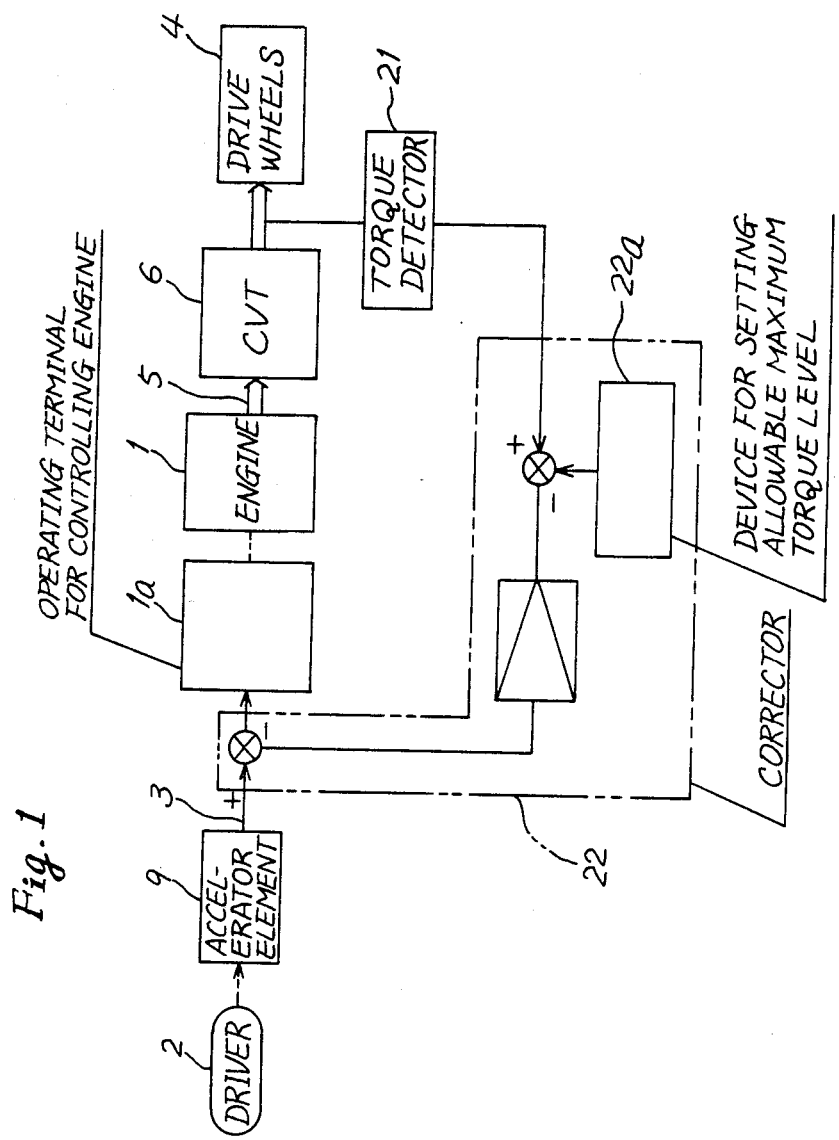
FIG. 1 is a schematic diagram showing the principle of the invention.

The acceleration control system of the invention can be applied to an automobile which, as schematically shown in FIG. 1, is provided with an engine 1 the output of which is changed in accordance with the amount of operation applied to an operating terminal 1a for controlling the engine 1, a first transmitting line 3 for transmitting the amount of operation which the driver applies to an accelerator element 9 to the operating terminal 1a for controlling the engine, a second transmitting line 5 for transmitting the output of the engine to the drive wheels 4, and a continuously variable transmission (CVT) 6 which is connected in the second transmitting line 5 and whose reduction ratio can be made infinite or close to infinity at the time of start.

The acceleration control system comprises a torque detector 21 for detecting the output torque of the transmission 6, and a corrector 22 for correcting the amount of operation to be applied to the operating terminal 1a through the first transmitting line 3 in such a manner that when the torque detector 21 has detected the output torque of the engine having exceeded a predetermined allowable maximum level, the output of the engine is reduced so as to offset the excessive amount of torque.

The torque detector 21 is so arranged as to take out a physical quantity corresponding to the output torque of the transmission 6, and the corrector 22 is so arranged as to compare the physical amount with a predetermined allowable maximum level provided by a setting device 22a and amplify the excessive amount, if any, for negative feedback.

With the arrangement of the invention, if the driver applies so great an amount of operation to the accelerator element 9 that the output torque of the transmission 6 exceeds the allowable maximum level, the torque detector 21 detects the excess amount so that the corrector 22 operates to reduce the amount of operation to be transmitted from the accelerator element through the first transmitting line 3 to the engine control operating terminal to a level lower than the actual amount of operation applied by the driver to the accelerator element. As a result, the output of the engine is reduced to a proper level and the output torque from the transmission 6 is lowered to the allowable maximum level.

DESCRIPTION OF PREFERRED EMBODIMENTS

Figure 2:
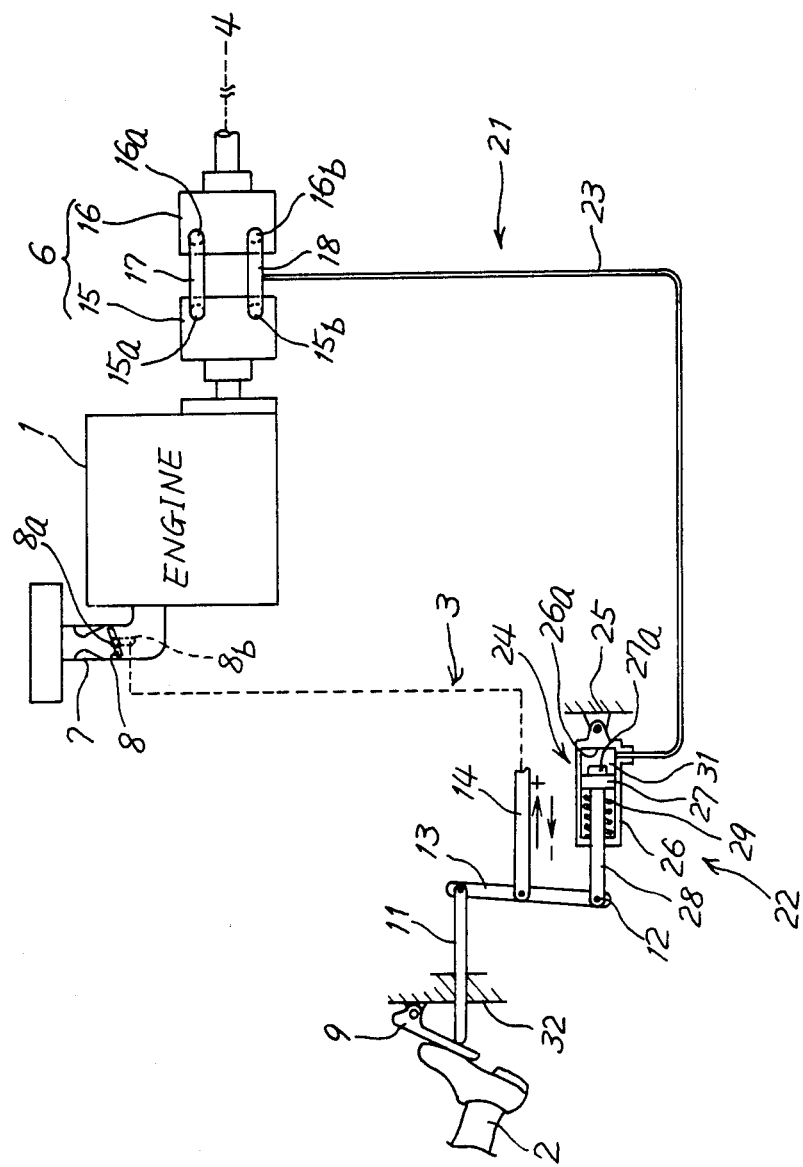
FIG. 2 is a schematic diagram of one embodiment of the invention.

Referring to FIG. 2, there is shown a diagram of the acceleration control system as applied to an automobile having an engine 1, the output of which can be changed by changing the amount of operation applied to an operating terminal 1a for controlling the engine, a transmitting line 3 for transmitting the amount of operation applied by a driver 2 to an accelerator pedal 9 to the operating terminal of the engine, a transmitting line 5 for transmitting the output of the engine to the drive wheels 4 of the automobile, and a continuously variable transmission 6 which is connected in the transmitting line 5 and which has a reduction ratio which can be made infinite when the automobile is started.

In particular, the engine 1 is a gasoline engine provided with a carburetor 7 having a throttle valve 8, a support shaft 8a and an operating arm 8b. The operating arm 8b of the throttle valve 8 corresponds to the previously mentioned operating terminal 1a for controlling the engine.

The transmitting line 3 may comprise a rod 11 having an outer end in contact with the accelerator pedal 9 and supported by a frame 32 so as to be axially movable forward or backward in response to the operation of stepping on or releasing the accelerator pedal 9, a lever 13 pivotally connected at one end thereof to the opposite end of the axially movable rod 11 and having a support point 12 at the opposite end thereof, and a linkage 14 connecting the lever 13 at an intermediate point between the opposite ends thereof to the operating arm 8b of the throttle valve 8. Alternatively, the transmitting line 3 may comprise a cable mechanism.

The transmission 6 is of a hydrostatic type comprising a combination of a first hydraulic pump/motor 15 of a variable displacement type connected to the output shaft of the engine 1 and a second hydraulic pump/motor 16 of a variable displacement type connected to the drive wheels 4, with a pair of oil pipes 17 and 18 connecting the outlet/inlet ports 15a and 15b of the hydraulic pump/motor 15 to the inlet/outlet ports 16a and 16b, respectively, of the hydraulic pump/motor 16.

Alternatively, the transmission may be of a hydromechanical type comprising a hydraulic pump/motor of a variable displacement type connectable to the output of the engine through a gear and clutch mechanism and a hydraulic pump/motor of a variable displacement type connectable to the drive wheels through the above-mentioned gear and clutch mechanism the two pump/motors being connected to each other in a manner similar to that in the hydrostatic type.

The acceleration control system of the invention comprises a torque detector 21 for detecting the output torque of the transmission 6 and a corrector 22 for correcting the amount of operation to be applied to the operating arm 8b of the throttle valve 8 through the transmitting line 3. When the detector 21 has detected the output torque of the engine 1 having exceeded a predetermined allowable maximum level, the corrector 22 corrects the amount of operation to be applied to the operating arm 8b of the throttle valve 8 so as to reduce the output of the engine and offset the excessive amount of torque. In particular, the torque detector 21 takes out through a pilot pipe 23 the oil pressure of that side of the oil circuit in the transmission 6 which becomes higher when the automobile is accelerated, such as for example the oil pressure in the connecting pipe 18. In the transmission 6 of this type, since the oil pressure in the higher pressure side of the oil circuit is proportional to the output torque of the transmission 6, the oil pressure is taken out as a physical amount representing the output torque.

The corrector 22 comprises a single-acting hydraulic cylinder 24 which supports the pivot 12 of the lever 13. The oil pressure taken out of the transmission 6 through the pilot pipe 23 operates the cylinder 24 so as to adjust the position of the support point 12. In particular, the hydraulic cylinder 24 comprises a cylindrical casing 26 having a rear end wall 26a pivotally supported by a fixed frame 25, a piston 27 slidable inside the casing 26, a rod 28 extending from the piston 27 axially out of the forward end of the casing 26, with the previously mentioned support point 12 being supported by the outer end of the piston rod 28, and a compression spring 29 urging the piston 27 so that the rod 28 is retracted into the casing 26.

Inside the casing 26 between the piston 27 and the rear end wall 26a there is formed a chamber 31 the displacement of which varies as the piston 27 is moved by the pressure oil introduced into or withdrawn out of the chamber 31 through the pilot pipe 23 connected between the transmission 6 and the chamber 31. The spring 29 is a coil spring having a number of turns and so designed as to keep the piston 27 at the most retracted position, with a predetermined preload corresponding to the allowable maximum level of the output torque of the engine being applied to the piston.

The operation of the system will now be described. While the automobile is not moving with the engine idling, the displacement of the hydraulic pump/motor 15 of the transmission 6 is kept zero while that of the other hydraulic pump/motor 16 is kept at the maximum so that the output of the engine is not being transmitted to the drive wheels. In other words, the reduction ratio of the transmission 6 is kept at infinity.

Under the condition, the driver steps on the accelerator pedal 9 to increase the output of the engine and at the same time gradually increase the displacement of the hydraulic pump/motor 15 thereby to start and accelerate the automobile, with a microcomputer, not shown, controlling the reduction ratio in response to the input signals thereto corresponding to the speed of the automobile, the position of the throttle valve, and so on. If the accelerator pedal 9 is stepped on too deep when the automobile is started, the acceleration control system operates to correct the amount of operation on the accelerator pedal. So long as the accelerator pedal 9 is properly operated so that the output torque of the transmission 6 is kept below a predetermined allowable maximum level, the oil pressure taken out of the transmission 6 through the pilot line 23 is kept at a corresponding lower level. Under the condition the spring 29 holds the piston 27 at the most retracted position in the cylinder 24 where a projection 27a on the piston abuts on the inner surface of the end wall 26a of the cylinder casing 26, so that the support point 12 of the lever 13 of the transmitting line 3 is held at a normal position.

If the accelerator pedal 9 is stepped on excessively so that the output torque of the transmission 6 exceeds the allowable maximum level, the force exerted on the piston 27 by the pressure of the oil introduced into the cylinder chamber 31 through the pilot line 23 comes to exceed the preload imposed by the coil spring 29 on the piston 27 in the opposite direction, so that the the piston 27 is moved forward or to the left in FIG. 2 as far as the force provided by the oil pressure balances the counterforce provided by the compression of the spring 29.

As the piston 27 advances, it carries thereon the support point 12 of the lever 13 forwardly of the normal position thereby to reduce the amount of operation on the accelerator pedal 9 to be transmitted to the operating arm 8b of the carburetor 7. The amount of operation of the cylinder 24, that is, the distance of displacement of the support point 12 on the outer end of the piston rod 28 corresponding to the amount of change of the oil pressure in the cylinder chamber 31 is determined by the spring constant of the spring 29. In the control system of the invention, the spring 29 has a spring constant such that the excessive amount of the output torque of the transmission 6 over the allowable maximum amount is offset by the operation of the cylinder 24. In other words, the spring constant is such that so long as the output torque is kept below the allowable maximum level, the spring 29 keeps the piston 27 stationary regardless of variation of the oil pressure in the chamber 31, and that when the output torque exceeds the maximum level, the spring 29 yields to the excessive pressure of the working oil in the transmission and consequently in the cylinder chamber 31 thereby to allow the piston 27 to be moved such a distance as to offset the excessive oil pressure. Therefore, despite the excessive amount of operation on the accelerator pedal 9, the amount of operation transmitted to the operating arm 8b of the throttle valve 8 is kept at a proper level to keep the output torque of the transmission 6 below the allowable maximum level.

Thus, with the control system of the invention, even if the accelerator pedal 9 is operated more or less excessively, the output torque of the transmission 6 is kept below the allowable maximum level thereby to prevent the drive wheels 4 from slipping on the road and/or the engine from racing.

In the illustrated embodiment the engine is provided with a carburetor. The system of this invention may be applied to other types of engines such as a gasoline engine of the fuel injection type and a diesel engine. In the fuel injection type, the electrical actuator for controlling the needle of the fuel injector serves as the operating terminal for controlling the engine. In diesel engines, the control lever for the governor of the fuel injection pump serves as the operating terminal of the engine.

The transmission may be of any other suitable type such as for example a hydromechanical type. The torque detector may be what is called a torque sensor which senses the torque acting on the output shaft of the transmission as a resilient displacement of a member and transforms the displacement into a corresponding electrical signal.

The corrector is not limited to the illustrated hydromechanical type but may be of an electro-mechanical type or an electrohydraulic type. In case of a fuel injection type of engine the corrector may be of a completely electrical type.

With the control system of the invention it is possible to eliminate with ease and without fail the various troubles and inconveniences which are likely to occur with a continuously variable transmission the reduction ratio of which can be made infinite when the automobile is started, such as the output torque becoming excessive to cause slipping of the tires on the road and racing of the engine.

What I claim is:

1. In an acceleration control system for an automobile having drive wheels, said control system being provided with:

an engine having an output and an operating means for controlling said engine;

the output of said engine varying in response to said operating means;

a first transmitting line connected to said operating means and being responsive to a position of an accelerator element and an acceleration linkage means;

a second transmitting line for transmitting the output of said engine to the drive wheels of said automobile; and said second transmitting line including a continuously variable transmission having a high and low pressure side and having a reduction ratio which can be rendered infinite when said automobile is started;

and said acceleration control system having a torque detecting means including a pilot pipe means for detecting an output torque of said continuously variable transmission, said pilot pipe means having a first end connected to a high pressure side of an oil circuit in said continuously variable transmission so that a pressure in said pilot pipe means is substantially equal to the pressure of the working oil in said high pressure side of said oil circuit, said high pressure corresponding to the output torque of said continuously variable transmission; and means for correcting an amount of input to be applied by said acceleration element to said operating means through said first transmitting line in such a manner that when said torque detecting means detects the output torque of said engine having exceeded a predetermined allowable maximum level, said engine output is reduced so as to offset the excessive amount of torque;

the improvement comprising:

said first transmitting line having a linkage means including:

a lever having a support point and adapted to be pivoted about said support point by an input from said accelerator element; and means connected to said lever for transmitting a movement of said lever to said operating means;

and wherein said correcting means comprises:

a hydraulic cylinder having a chamber;

a piston slidable in said chamber;

a piston rod extending outside said chamber and providing the support point for said lever;

said pilot pipe having a second end communicating with said chamber at one side of said piston opposite said piston rod so as to introduce the high pressure of said working oil of said continuously variable transmission into said chamber at said one side of said piston so as to urge said piston and piston rod in a direction of the force of the working oil of said continuously variable transmission thereby displacing said support point of said lever; and a spring disposed in said chamber at the opposite side of said piston so as to counteract the force exerted on said piston by said working oil from said continuously variable transmission.

2. The improvement of claim 1, wherein said spring has a spring constant such that so long as the output torque of said continuously variable transmission is kept below said allowable maximum level, said spring keeps said piston stationary regardless of variation of the oil pressure in said chamber, and that when said output torque exceeds said maximum level, said spring yields to the excessive pressure of said working oil thereby to allow said piston to be moved such a distance as to offset said excessive oil pressure.

3. The acceleration control system of claim 1, wherein said continuously variable transmission is of a hydromechanical type.

4. The system of claim 3, wherein said continuously variable transmission comprises a combination of a first hydraulic pump/motor of a variable displacement type connectable to the output of said engine and a second hydraulic pump/motor of a variable displacement type connectable to said drive wheels, said first and second hydraulic pump/motors each having an outlet port and an inlet port, with the outlet/inlet ports of one of said hydraulic pump/motors communicating with the inlet/outlet ports, respectively, of the other of said hydraulic pump/motors.

5. The acceleration control system of claim 1, wherein said continuously variable transmission is of a hydrostatic type.

6. The acceleration control system of claim 5, wherein said continuously variable transmission comprises a combination of a first hydraulic pump/motor of a variable displacement type connected to the output of said engine and a second hydraulic pump/motor of a variable displacement type connected to the drive wheels of said automobile, said first and second hydraulic pump/motors each having an outlet port and an inlet port with the outlet/inlet ports of one of said hydraulic pump/motor communicating with the inlet/outlet ports, respectively, of the other of said hydraulic pump/motors.

7. The acceleration control system of claim 1, wherein said engine is a gasoline engine having a fuel injector with a needle, and said operating terminal is an electrical actuator for controlling the needle of the fuel injector of said engine.

8. The acceleration control system of claim 1, wherein said engine is a diesel engine having a fuel injection pump with a control lever for controlling a governor, and said operating terminal is the control lever for controlling the governor of the fuel injection pump of said diesel engine.

* * * * *